Aug. 17, 1926.

W. F. GROENE 1,596,827

RELIEVING ATTACHMENT FOR MACHINE TOOLS AND THE LIKE

Filed March 8, 1923 7 Sheets-Sheet 2

Inventor
WILLIAM. F. GROENE
By
Attorney

Aug. 17, 1926.

W. F. GROENE 1,596,827

RELIEVING ATTACHMENT FOR MACHINE TOOLS AND THE LIKE

Filed March 8, 1923    7 Sheets-Sheet 3

Inventor
WILLIAM F. GROENE
By
Attorney

Aug. 17, 1926.

W. F. GROENE 1,596,827

RELIEVING ATTACHMENT FOR MACHINE TOOLS AND THE LIKE

Filed March 8, 1923 7 Sheets-Sheet 4

Inventor
WILLIAM F. GROENE
By *Walter F. Murray*
Attorney

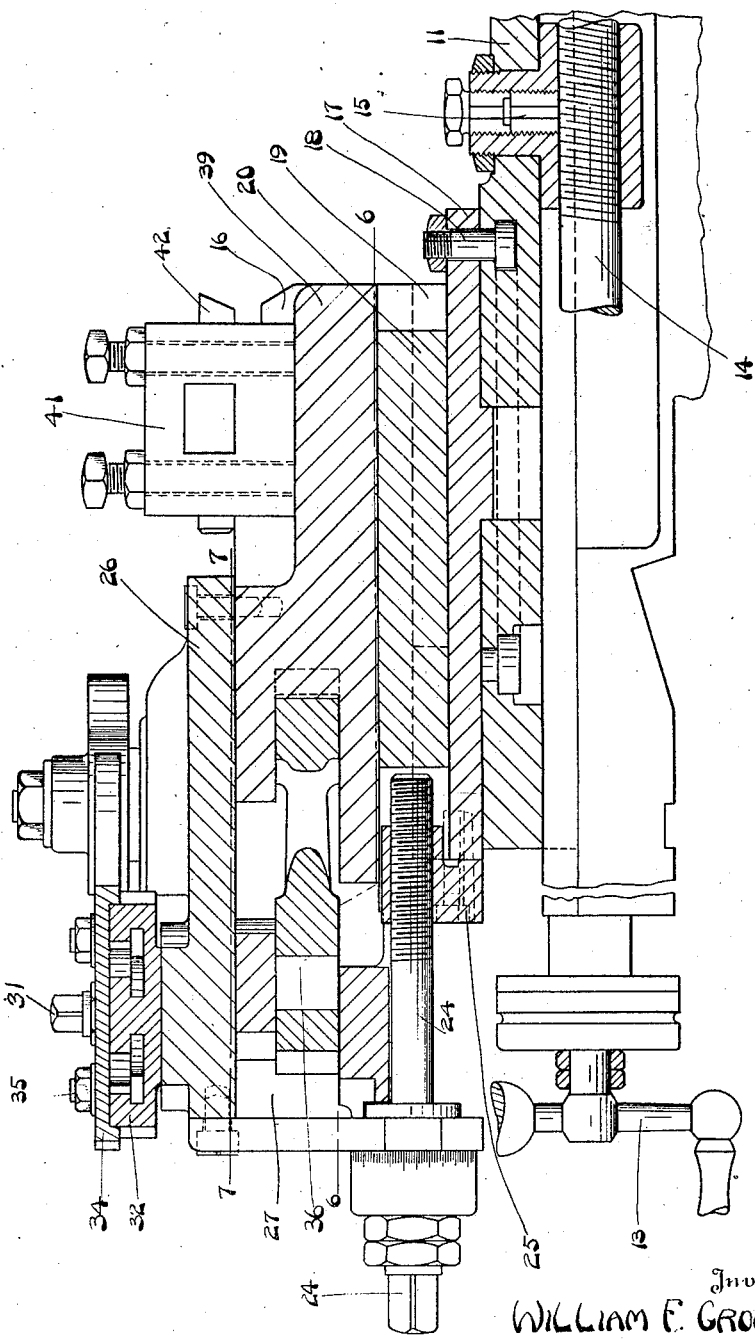

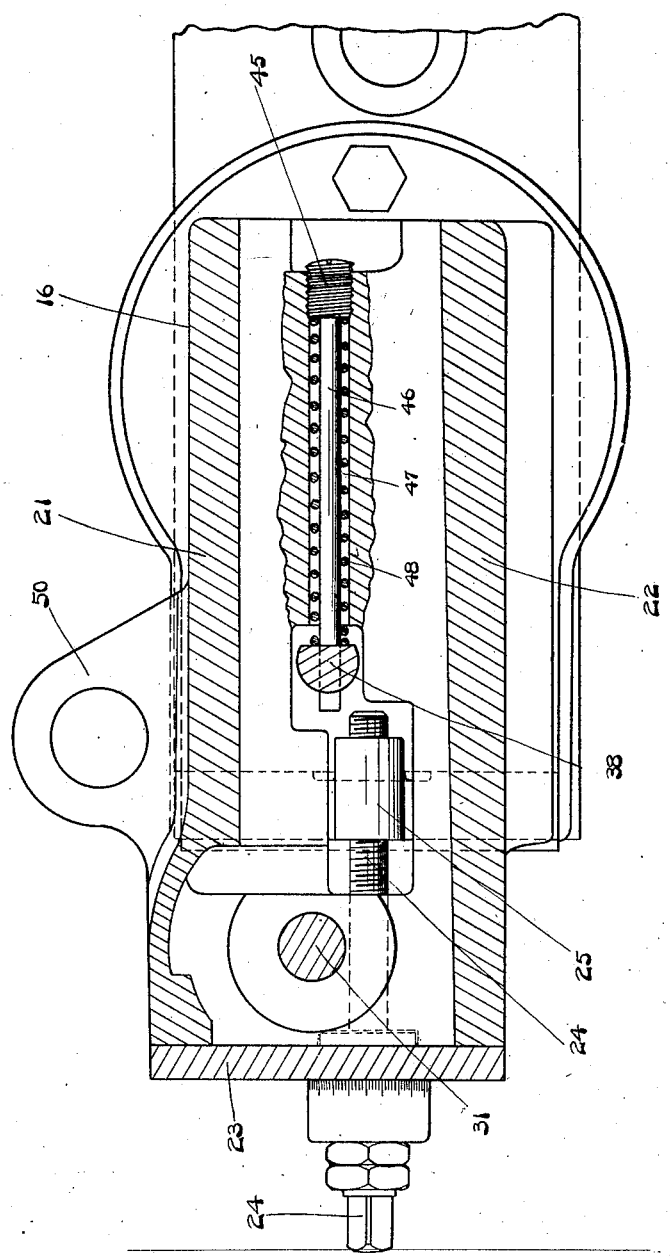

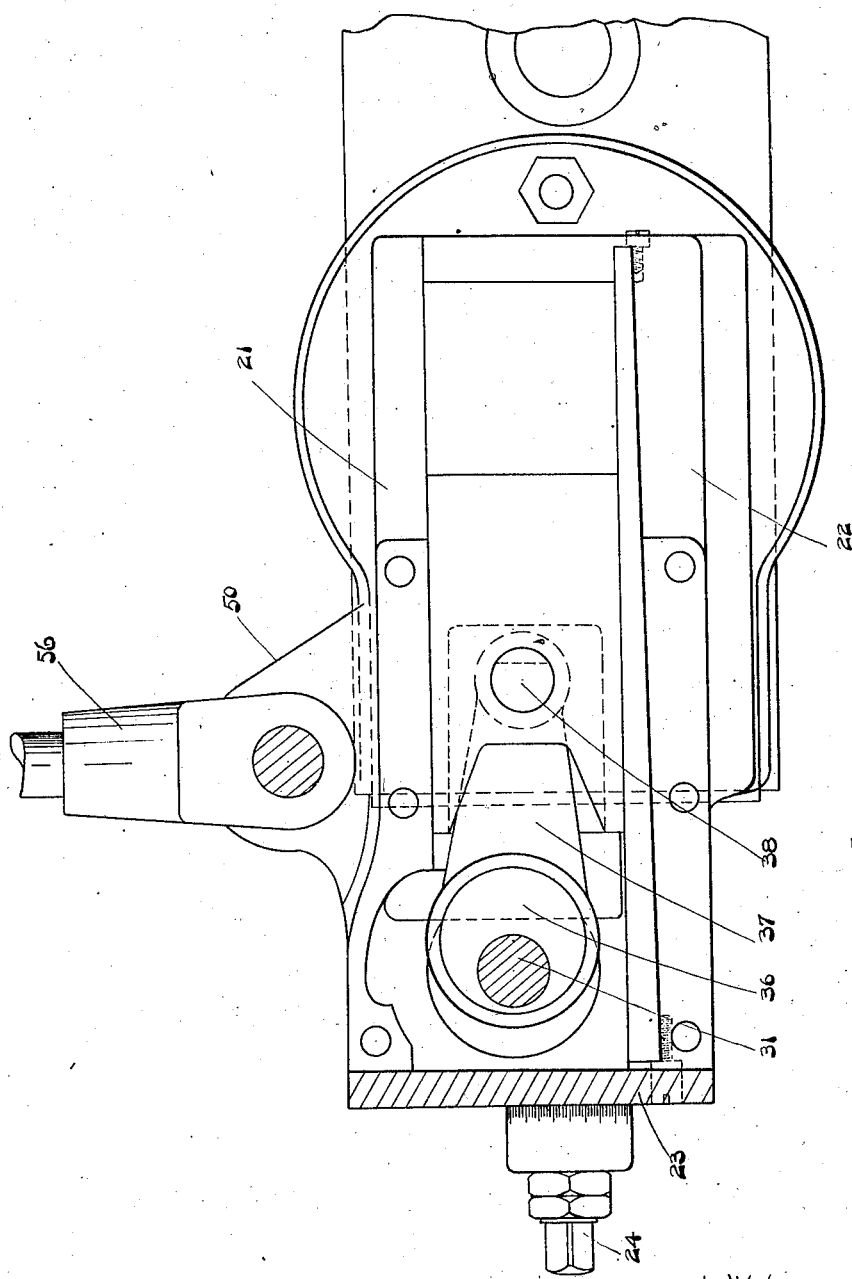

Patented Aug. 17, 1926.

1,596,827

UNITED STATES PATENT OFFICE.

WILLIAM F. GROENE, OF CINCINNATI, OHIO, ASSIGNOR TO THE R. K. LEBLOND MACHINE TOOL COMPANY, OF CINCINNATI, OHIO, A CORPORATION OF DELAWARE.

RELIEVING ATTACHMENT FOR MACHINE TOOLS AND THE LIKE.

Application filed March 8, 1923. Serial No. 623,797.

An object of my invention is to provide a simple and efficient relieving attachment used with machine tools and the like.

Another object of my invention is to provide a device of the class described, that is capable of minute and accurate adjustment.

These and other objects are attained by the means described herein and disclosed in the accompanying drawings, in which:

Fig. 5 is a sectional view on line 5—5 of Fig. 3.

Fig. 6 is a sectional view on line 6—6 of Fig. 5.

Fig. 7 is an enlarged sectional view on line 7—7 of Fig. 5.

Figure 1:
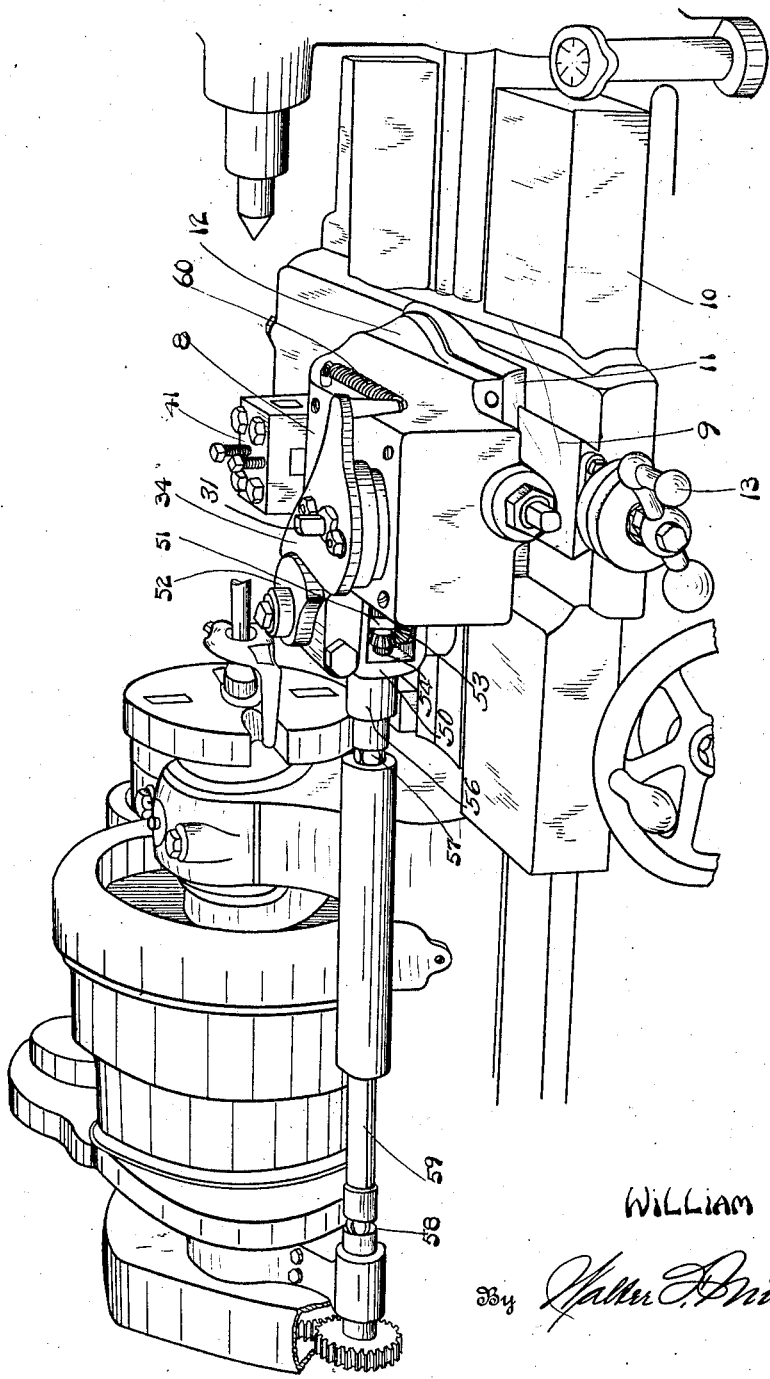
Fig. 1 is a fragmental perspective view of a lathe having mounted on it a relieving attachment embodying my invention.
Figure 2:
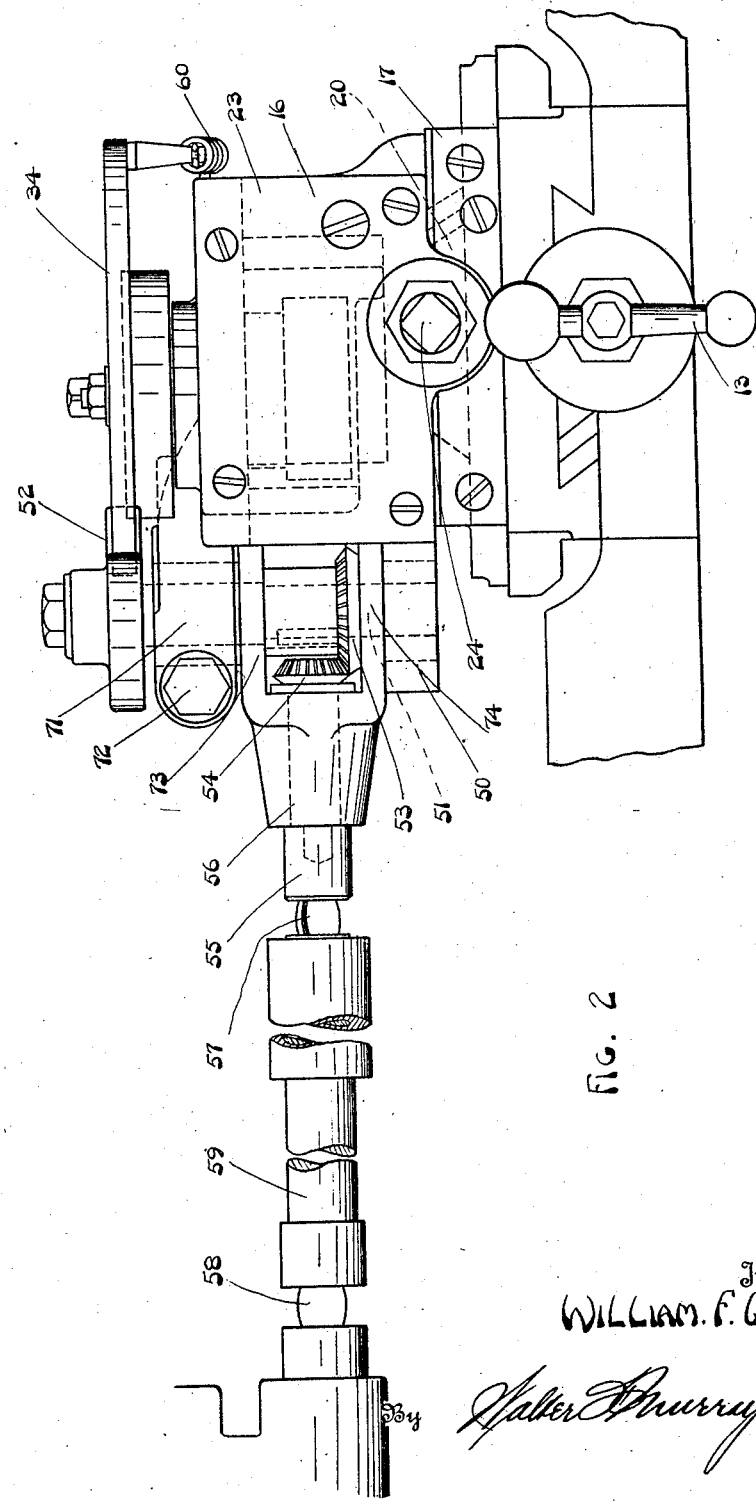
Fig. 2 is an enlarged front elevation of a device embodying my invention.
Figure 3:
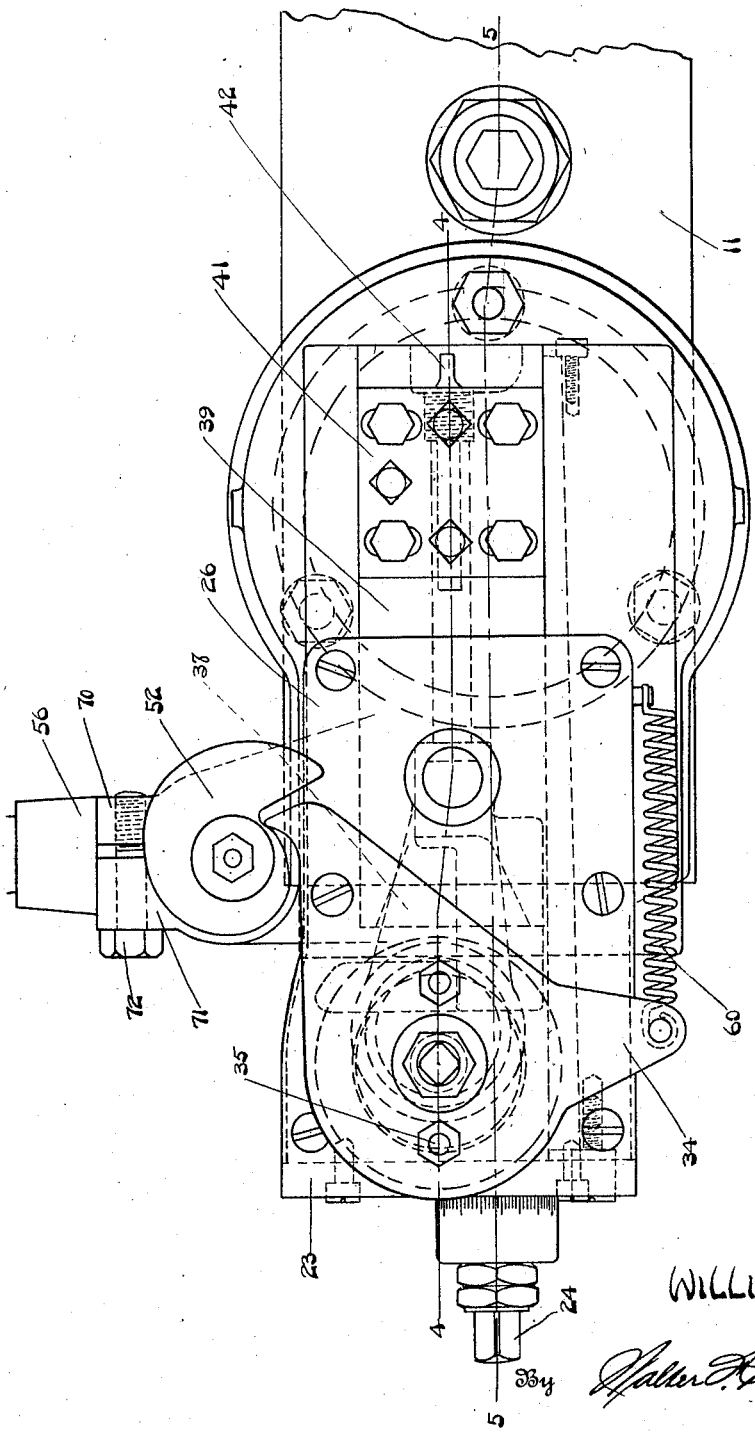
Fig. 3 is a plan view of a device shown in Fig. 2.
Figure 4:
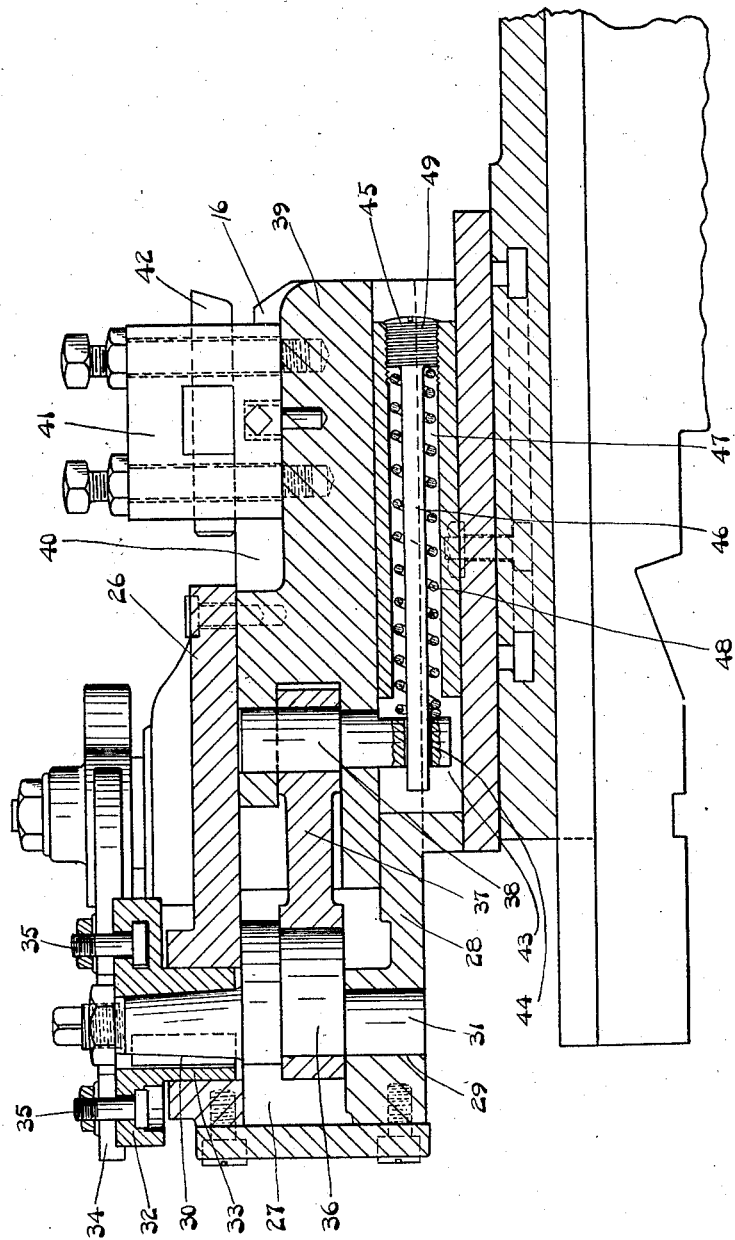
Fig. 4 is a sectional view on line 4—4 of Fig. 3.

A device 8 embodying my invention is adapted to be mounted on the way 9 of the carriage 10 of a machine tool, and in substantially the same way as are tool holders and the like mounted upon such carriages. The device 8 may be adjusted transversely of the bed of the machine tool, and is also capable of adjustment about a vertical axis. This last referred to adjustment is accomplished in substantially the same way in which tool holders are adjusted about a vertical axis, namely, by providing a base 11 for transverse adjustment and supporting an upper structure 12 capable of arcuate adjustment upon the base 11. My invention is concerned with the elements mounted on and carried by the upper structure 12 and the arrangement of these parts, whereby they will function properly. The arcuate adjustment of the herein described elements about the base 11 constitutes one phase of my invention. The carriage 10 carries a customary hand crank 13 at the outer end of the screw 14 engaging the block 15 carried by the base 11 of the device 8. The upper structure 12 of the device comprises a housing or casing 16 reciprocally mounted on a slide 17, which slide is mounted upon the base 11 for arcuate adjustment, and which slide will be secured upon the base by means of suitable bolts 18 as is common in the art. The slide 17 has formed in it a dovetailed groove 19 and in said dovetailed groove is reciprocally contained a dovetailed rail 20 formed on the base of the housing 16. The side walls 21 and 22 of the housing carry at their forward ends an end plate 23. A screw 24 extends through the end plate and engages a threaded block 25 carried by the slide 17. A cover plate or top plate 26 is mounted upon the sides of the housing and forms a cover for the top of the housing and the chamber 27 formed within the housing. The base 28 of the housing has formed in it a bore 29, and the cover 26 has formed in it a bore 30 which is vertically aligned with the bore 29 when the cover is mounted upon the housing. A follower or eccentric shaft 31 has its lower end disposed within the bore 29, and its upper end extends through the bore 30. The upper end of the shaft 31 is tapered and has fixedly mounted upon it a disc 32 carrying a hub 33, which hub forms a bearing upon the wall of the bore 30 in the cover 26. The disc has a cam follower 34 adjustably mounted upon its upper face, by any suitable means such as the bolts 35. The cam follower is adjustable upon the disc about the axis of the shaft 31. The shaft 31 has formed on it an eccentric bearing 36, the eccentric bearing being contained within the chamber 27. A pitman or crank 37 has one of its ends mounted upon the eccentric bearing 36 and has its other end mounted on a shaft 38 carried by the forward end of a reciprocating block 39 contained within a way 40 formed between the sides 21 and 22 of the housing. The rear end of the block 39 carries suitable means 41 for holding a cutting tool such as 42 or a grinder. The shaft 38 extends downwardly into an opening 43 in the housing, and the downwardly extending portion of the shaft has formed through it a bore 44. A screw 45 carried by the housing has formed on it a reduced stem 46 contained within a bore 47 formed in the housing, and extends through the bore in the shaft 38. A spring 48 has its opposite ends in abutment upon the threaded head 49 of the screw and upon the lower end of the shaft 38 thereby yieldingly resisting rearward movement of the block 39. The supplemental housing 50 carried by the side 21 of the casing 16 supports a cam shaft 51. The cam shaft 51 carries at its upper end a cam 52 adapted to engage the cam follower 34. The shaft 51 also carries a bevel gear 53 in engagement with a bevel gear 54 carried by a shaft 55 supported by the journal bearing 56 revolubly mounted on the supplemental housing 50. The upper portion of the supplemental housing is developed into a split or clamp bearing, the parts 70 and 71 of which may be drawn together by any suitable means such as the bolt 72 whereby to secure the journal 56 in adjusted position. As shown herein the arms 73 and 74 of the journal serve as bearings for the cam shaft, the cam shaft in turn serving as the axis upon which the journal is adjusted. The shaft 55 has rotatory motion imparted to it through universal joints 57 and 58, and shaft 59 from any suitable source such as the head stock of a lathe as shown in Fig. 1. The shaft 59 is telescopic. A spring 60 mounted upon the exterior of the housing 16 yieldingly retains a cam follower 34 in engagement upon the cam 52.

The cam 52 is so constructed that the joint action of itself and the spring 60 upon the cam follower 34 imparts an oscillating movement to the shaft 31. From the foregoing it will be apparent that the oscillation of the shaft 31 through the eccentric 36, is translated into a reciprocating motion of the block 39. The extent of the reciprocation of block 39 will be determined by the arc through which the eccentric is actuated, and also by the points between which the eccentric bearing is oscillated. By reference to Fig. 7 it will be observed that the eccentric 36 is so disposed that oscillation thereof through a given arc will effect a minimum reciprocation of the sliding block, and as the eccentric is adjusted about the axis of the shaft 31 from the position shown in said figure, oscillation of eccentric 36 through the said given arc will effect a longer stroke of the reciprocating block. Adjustment of the eccentric is effected by loosening the nuts and bolts 35 whereby to permit angular adjustment of the cam follower 34 and the disc 32 relative to one another, whereupon the nuts and bolts are again tightened for securing the cam follower and disc upon one another.

The operation of my device is as follows:
Rotatory motion is imparted to the shaft 51 from the head stock, the cam 52 rotating with the shaft 51. The contour of cam is such that the cam follower 34 is slowly moved away from the shaft 51 against the yielding resistance of spring 60. The movement of the cam follower 34 is imparted to the shaft 31 wherefore the eccentric bearing 36 actuates the pitman 37 longitudinally of itself, the extent of this reciprocation being determined by the points between which the eccentric bearing is oscillated about the axis of the shaft 31. The reciprocation of the pitman 37 is transmitted to the block 39. The spring 48 yieldingly resists movement of the block 39 rearwardly between the eccentric and the crank 37. The relations of the several parts permit annular adjustment of the housing 16, in relation to the base 11, and also permits adjustment of the device transversely and longitudinally of the bed of the machine tool without impairing the operation of the device or in any way modifying the extent of reciprocation as a result of the adjustment of the device to various positions in relation to the work or the machine tool carrying the device. This is made possible by employment of the bevel gears for receiving rotatory motion from the telescopic shaft 59 and for transmitting such rotatory motion to the cam shaft, regardless of the adjustment of the housing upon the base 11.

What I claim is:

1. In a device of the class described the combination of a revoluble shaft, a cam mounted on the shaft, an oscillating shaft, a cam follower mounted on the oscillating shaft, means yieldingly retaining the cam follower in engagement upon the cam, an eccentric bearing formed on the oscillating shaft, a reciprocally mounted tool supporting block, and a crank pivotally mounted upon the block and the eccentric bearing.

2. In a device of the class described the combination of a housing having a chamber therein and a way connected with the chamber, a tool supporting block reciprocally mounted in the way, an eccentric shaft extending thru the housing into the chamber, a crank within the chamber pivotally mounted upon the eccentric shaft and the reciprocating block, a cam follower mounted upon the eccentric shaft exteriorly to the housing, a cam shaft carried by the housing, a cam mounted on the cam shaft engaging the cam follower, means yieldingly retaining the cam follower in engagement upon the cam, and means for revolubly actuating the cam shaft.

3. In a device of the class described the combination of a housing, a shaft carried by the housing, a journal bearing adjustable about the shaft, means for securing the journal in adjusted position, a revoluble shaft carried by the journal, means for transmitting rotatory motion from the second mentioned shaft to the first mentioned shaft, a reciprocating block carried by the housing, and means for translating rotatory motion of the first mentioned shaft into a reciprocating motion of the block.

4. In a device of the class described the combination of a revoluble shaft, a second revoluble shaft adjustable about the axis of the first shaft, means for securing the shafts in adjusted position, means for transmitting motion between the shafts, a reciprocating block, and means for translating rotatory motion of the first mentioned shaft into a reciprocating motion of the block.

5. In a device of the class described the combination of a revoluble shaft, a drive shaft adjustable about the axis of the revoluble shaft having a driving connection with the revoluble shaft, an eccentric shaft, cooperating means carried by the revoluble shaft and the eccentric shaft for converting rotatory motion of the revoluble shaft into oscillatory motion of the eccentric shaft, a reciprocating block, and a connection between the block and the eccentric shaft for converting the oscillatory motion of the eccentric shaft into a reciprocating motion of the block.

6. In a device of the class described the combination of a revoluble shaft, a drive shaft adjustable about the axis of the revoluble shaft having a driving connection with the revoluble shaft, an eccentric shaft, cooperating means carried by the revoluble shaft and the eccentric shaft for converting rotatory motion of the revoluble shaft into oscillatory motion of the eccentric shaft, a reciprocating block, a connection between the block and the eccentric shaft for converting the oscillatory motion of the eccentric shaft into a reciprocating motion of the block, and means for adjusting the eccentric shaft about its axis whereby to modify the extent of reciprocation of the block.

7. In a device of the class described the combination of a base, a housing mounted on the base for angular adjustment, a shaft mounted on the housing, a drive shaft having a driving connection with the first mentioned shaft mounted for adjustment about the axis of the first mentioned shaft, means for securing the first mentioned shaft in adjusted position, a reciprocating block carried by the housing, and means for converting the rotatory motion of the first mentioned shaft into a reciprocating motion of the block.

8. In a device of the class described the combination of a base, a housing mounted on the base for angular adjustment, a shaft mounted on the housing, a drive shaft having a driving connection with the first mentioned shaft mounted for adjustment about the axis of the first mentioned shaft, a reciprocating block carried by the housing, and adjustable means for converting the rotatory motion of the first mentioned shaft into a reciprocating motion of the block and for modifying the motion transmitted from the first mentioned shaft to the block.

9. In a device of the class described the combination of a revoluble shaft, a cam mounted on the shaft, an oscillating shaft, a cam follower mounted on the oscillating shaft, means yieldingly retaining the cam follower in engagement upon the cam, an eccentric bearing formed on the oscillating shaft, a reciprocally mounted tool supporting block, a crank pivotally mounted upon the block and the eccentric bearing, and means for effecting relative angular adjustment of the cam follower and the oscillating shaft for modifying the stroke of the reciprocally mounted tool supporting block.

In testimony whereof, I have hereunto subscribed my name this 26th day of Feb., 1923.

WILLIAM F. GROENE.